United States Patent
Bruno

(10) Patent No.: US 9,600,540 B1
(45) Date of Patent: Mar. 21, 2017

(54) DECISION PROCESSING APPLIED TO DATA ANALYTICS WORKFLOW

(71) Applicant: EMC Corporation, Hopkinton, MA (US)

(72) Inventor: Diego Salomone Bruno, Rio de Janeiro (BR)

(73) Assignee: EMC IP Holding Company LLC, Hopkinton, MA (US)

( * ) Notice: Subject to any disclaimer, the term of this patent is extended or adjusted under 35 U.S.C. 154(b) by 307 days.

(21) Appl. No.: 14/580,531

(22) Filed: Dec. 23, 2014

(51) Int. Cl.
*G06F 7/00* (2006.01)
*G06F 17/30* (2006.01)

(52) U.S. Cl.
CPC .. *G06F 17/30539* (2013.01); *G06F 17/30144* (2013.01); *G06F 17/30592* (2013.01); *G06F 17/30705* (2013.01); *G06F 2216/03* (2013.01)

(58) Field of Classification Search
CPC ................................................. G06F 17/30144
See application file for complete search history.

(56) References Cited

U.S. PATENT DOCUMENTS 9,432,430 B1 *  8/2016  Klenz ................... H04L 41/142
2016/0092484 A1 *  3/2016  Finkler ............. G06F 17/30336
                                                                   707/715

* cited by examiner

*Primary Examiner* — Ajith Jacob
(74) *Attorney, Agent, or Firm* — Ryan, Mason & Lewis, LLP

(57) ABSTRACT

Event data collected for a given event is obtained, wherein the event data comprises a plurality of time series data sets. The plurality of time series data sets are divided into a set of time windows (e.g., epochs). Data in the plurality of time series data sets occurring within each time window of the set of time windows is aligned. A metric is computed for each aligned time window, wherein the metric for each aligned time window represents a measure of at least one of completeness and support attributable to data in the aligned time window. Data is pruned from the set of event data for one or more of the set of time windows based on the computed metrics. The pruned event data is provided to a data analytics process which is configured to further process the pruned event data.

20 Claims, 9 Drawing Sheets

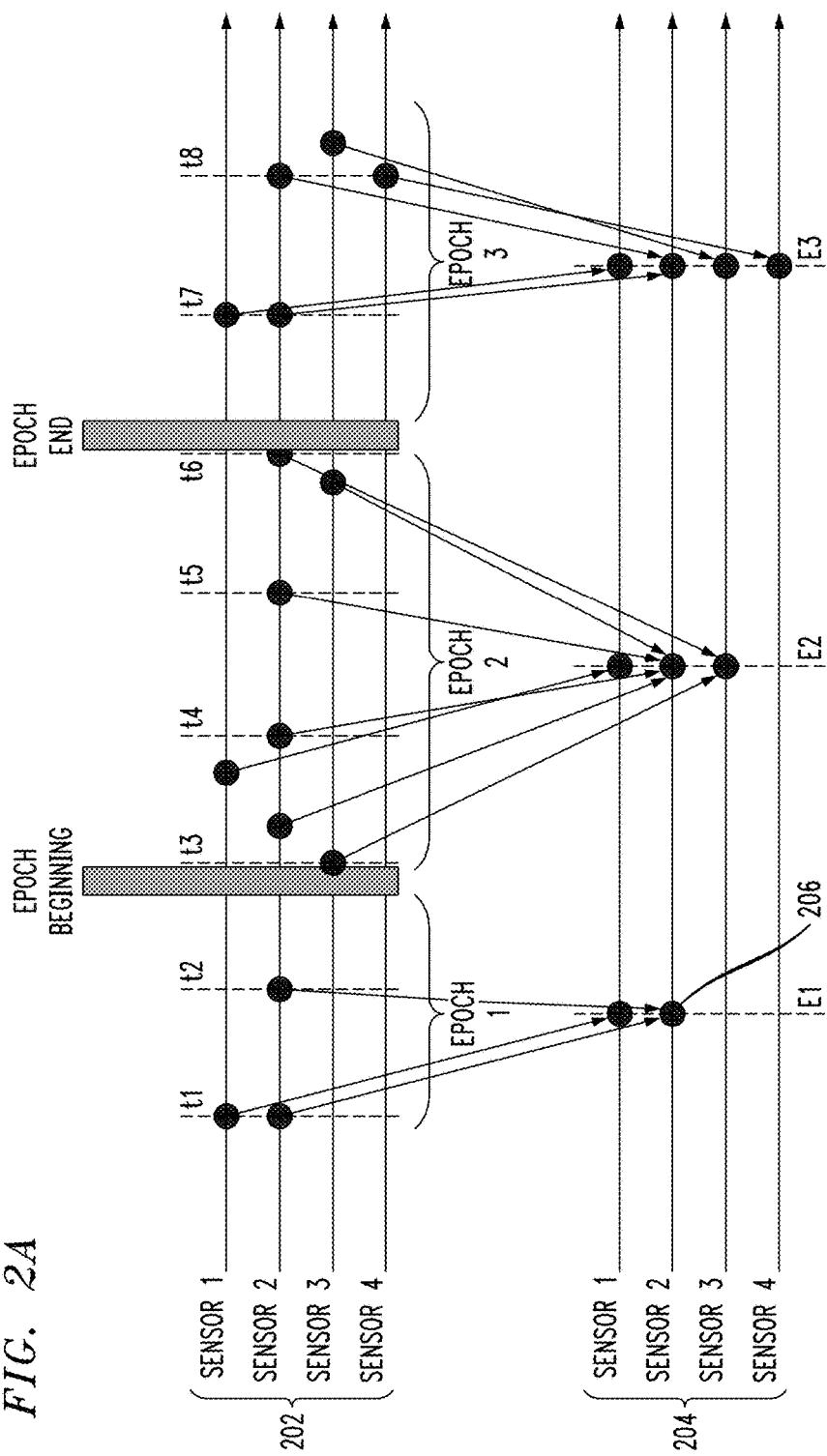

FIG. 2B

Output pane

| Data Output | Explain | Messages | History |

| epoch_clusters_id integer | c574 real | c575 real | c576 real | c577 real | c578 real | c582 real | c583 real | c584 real | c585 real |
|---|---|---|---|---|---|---|---|---|---|
| 39 | 151808 | 22.4577 | 21.9361 | 21.8551 | | 21.8698 | 22.1329 | 21.9964 | 22.0467 | |
| 40 | 151816 | 22.5262 | 21.9658 | 21.8371 | | 21.8401 | 22.1658 | 21.9276 | 22.0467 | |
| 41 | 152293 | | 24.0666 | | | 24.1633 | | 23.9314 | | |
| 42 | 152309 | 22.0975 | 22.3367 | 22.8953 | | 22.9885 | 21.9509 | 22.3969 | 23.6685 | |
| 43 | 152330 | 21.6738 | 21.9509 | 21.7627 | | 21.8551 | 21.6636 | 21.9291 | 22.9184 | |
| 44 | 152346 | 21.5789 | 21.8551 | 21.3367 | | 21.4148 | 21.5679 | 21.6984 | 22.2704 | |
| 45 | 152386 | 21.5566 | 21.7593 | 20.7416 | | 20.8705 | 21.3504 | 21.1853 | 22.4782 | |
| 46 | 152410 | 21.8491 | 22.085 | 22.7375 | | 22.7543 | 21.7653 | 21.8551 | 23.1689 | |
| 47 | 147026 | | | | | 23.9701 | | 23.5595 | 21.8551 | |
| 48 | 147468 | | 24.6471 | | | | | | | |
| 49 | 148552 | 26.0088 | 25.4164 | 25.6036 | | 25.6363 | 25.5618 | 25.6326 | -4.67456 | |
| 50 | 148803 | 25.8677 | 25.4238 | 25.4887 | | 25.4779 | | 25.6717 | 25.9111 | |
| 51 | 149058 | 25.9436 | 26.0478 | 26.0575 | | | 26.0087 | 26.0087 | 26.1064 | |
| 52 | 149301 | 24.1484 | | | | 24.0052 | 23.954 | 23.8414 | 24.0146 | |
| 53 | 149413 | 28.1445 | 24.5726 | 24.2988 | | 24.6139 | 24.7575 | 24.5245 | | |
| 54 | 149660 | 24.9556 | 24.208 | 25.0394 | | 25.1629 | 25.1214 | | | |
| 55 | 149967 | | | | | | | | | |
| 56 | 151011 | | | | | | | | | |
| 57 | 151035 | | | | | | | | | |
| 58 | 151058 | | | | | | | | | |
| 59 | 151074 | | | | | | | | | |
| 60 | 151090 | 24.5395 | | | | 23.1489 | 21.7473 | | | |
| 61 | 151122 | 23.6364 | | | | 23.3705 | 22.1383 | | | |
| 62 | 151130 | 23.4878 | | | | 23.4878 | 22.3468 | | | |
| 63 | 151146 | 23.0907 | | | | 22.7099 | 22.0467 | | | |
| 64 | 151234 | 23.0066 | | | | 23.536 | | | | |

| c586 real | c587 real | c588 real | c589 real | c590 real | c591 real |
|---|---|---|---|---|---|
| 21.3311 | 22.4302 | | 21.5631 | 21.4985 | 21.8673 |
| 21.2983 | 22.4566 | | 21.4722 | 21.3765 | 21.876 |
| | | | | | |
| 20.9165 | 22.4814 | 22.6869 | 22.5962 | 22.2181 | 22.6964 |
| 21.3765 | 21.6431 | 22.2549 | 21.1853 | 20.9484 | 21.5487 |
| 21.4722 | 21.4015 | 22.1387 | 20.7075 | 20.5126 | 21.1853 |
| 21.4722 | 21.2753 | 21.7818 | 19.8487 | 19.7109 | 20.4885 |
| 21.3629 | 21.8471 | 22.3763 | 21.3705 | 21.1534 | 21.9988 |
| 22.0786 | 23.8092 | 24.0323 | | | |
| 24.4534 | | 28.2229 | | | |
| −1.28313 | 25.4308 | | | 25.3341 | |
| 25.5212 | 25.5212 | | | 25.6717 | |
| 25.8625 | 25.9111 | 25.716 | | 26.1064 | 25.5942 |
| 23.9262 | 23.9174 | 24.4534 | | 23.9174 | 23.8011 |
| 24.8033 | 24.1053 | 24.7052 | 25.2176 | 24.7393 | 24.782 |
| 25.1585 | 25.1502 | 25.4076 | 25.3107 | 25.0048 | 26.1829 |
| 480.5 | | | | | 480 |
| | | 25.711 | | | |
| | | 25.9563 | | | |
| | | 24.1896 | | | |
| | | 23.8697 | | | |
| 23.4265 | 24.6229 | 24.8241 | 22.9985 | 22.8623 | 23.6387 |
| 22.9448 | 23.8306 | 24.2415 | 23.5213 | 23.4075 | 23.769 |
| 22.4909 | 23.2821 | 24.0123 | 23.5045 | 23.2826 | 23.4878 |
| 22.1008 | 23.1989 | 23.536 | 22.2843 | 22.0427 | 22.4222 |
| 21.8551 | 23.4757 | 23.6806 | 23.6444 | 23.4517 | 23.8735 |

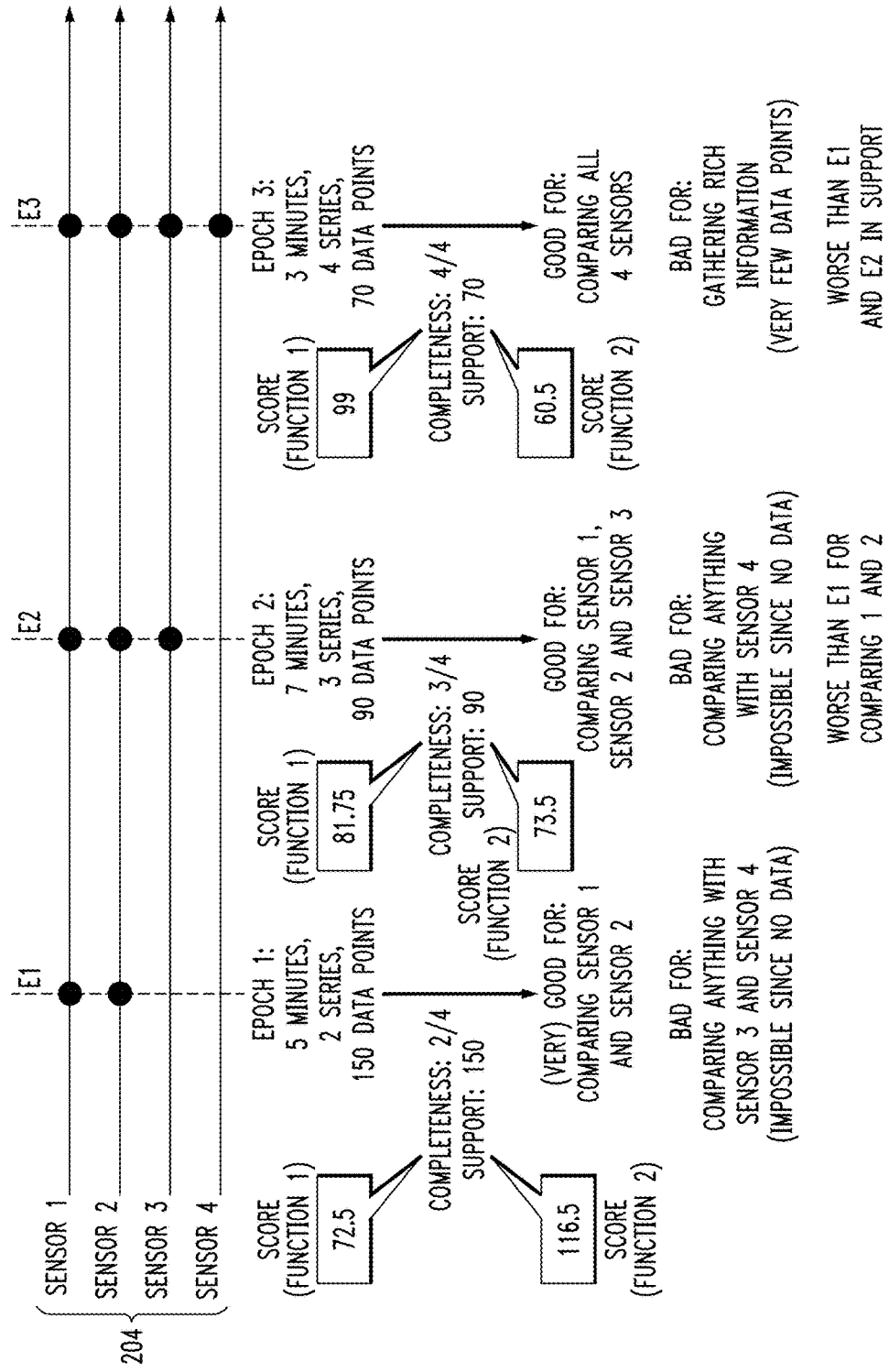

DECISION PROCESSING APPLIED TO DATA ANALYTICS WORKFLOW

FIELD

The field relates to data processing, and more particularly to methodologies for improving data mining where portions of data being mined are missing and/or non-synchronized.

BACKGROUND

Data mining based on time series analysis can be a difficult task. Time series analysis typically performed on data to discover features in the data may include, but is not limited to, data aggregation, data clustering, and principal component analysis (PCA). In order to perform such feature discovery, the data is typically processed prior to analysis to create a substantially complete and synchronized set of data for analysis. This is because portions of time series data can be incomplete and/or out of sync with other portions of time series data being analyzed. Certain existing data pre-processing techniques can be elaborate and complex, but still not necessarily yield adequate feature discovery results.

SUMMARY

Embodiments of the invention provide methodologies for improving data mining where data being mined (e.g., time series data) is missing and/or non-synchronized.

For example, in one embodiment, a method comprises the following steps. Event data collected for a given event is obtained, wherein the event data comprises a plurality of time series data sets. The plurality of time series data sets are divided into a set of time windows (e.g., epochs). Data in the plurality of time series data sets occurring within each time window of the set of time windows is aligned. A metric is computed for each aligned time window, wherein the metric for each aligned time window represents a measure of at least one of completeness and support attributable to data in the aligned time window. Data is pruned from the set of event data for one or more of the set of time windows based on the computed metrics. The pruned event data is provided to a data analytics process which is configured to further process the pruned event data.

In another embodiment, an article of manufacture is provided which comprises a processor-readable storage medium having encoded therein executable code of one or more software programs. The one or more software programs when executed by at least one processing device implement steps of the above-described method.

In a further embodiment, an apparatus comprises a memory and a processor operatively coupled to the memory and configured to perform steps of the above-described method.

These and other features and advantages of the present invention will become more readily apparent from the accompanying drawings and the following detailed description.

BRIEF DESCRIPTION OF THE DRAWINGS

FIG. 2A shows time series data divided into epochs in accordance with which one or more embodiments of the invention may be implemented.

FIG. 2B shows an aligned epoch matrix in accordance with which one or more embodiments of the invention may be implemented.

FIG. 3B shows a data pre-processing compromise example in accordance with one embodiment of the invention.

DETAILED DESCRIPTION

Illustrative embodiments of the invention will be described herein with reference to exemplary data processing systems, computing systems, data storage systems and associated servers, computers, storage units and devices and other processing devices. It is to be appreciated, however, that embodiments of the invention are not restricted to use with the particular illustrative system and device configurations shown. Moreover, the phrases "data processing system," "computing system" and "data storage system" as used herein are interchangeable and are also intended to be broadly construed, so as to encompass, for example, private or public cloud computing or storage systems, as well as other types of systems comprising distributed virtual infrastructure. However, a given embodiment may more generally comprise any arrangement of one or more processing devices.

Embodiments of the invention address the balancing issue between complexity and effectiveness with regard to incomplete and/or non-synchronized time series data used in data analytics by applying one or more decision theory-based concepts. For example, in one or more illustrative embodiments, a series of decision processes are applied to an analytics dataflow. Advantageously, data pre-processing and data post-processing are enriched with compromises that leverage more complete results without burdening the overall analytics process. The approach is domain-agnostic, tough. Illustrative embodiments can be used to solve a clustering problem, for example, but can be extended and applied to a series of different applications, such as, but not limited to, time series treatment, machine event logs, data aggregation, PCA, etc.

Figure 1:
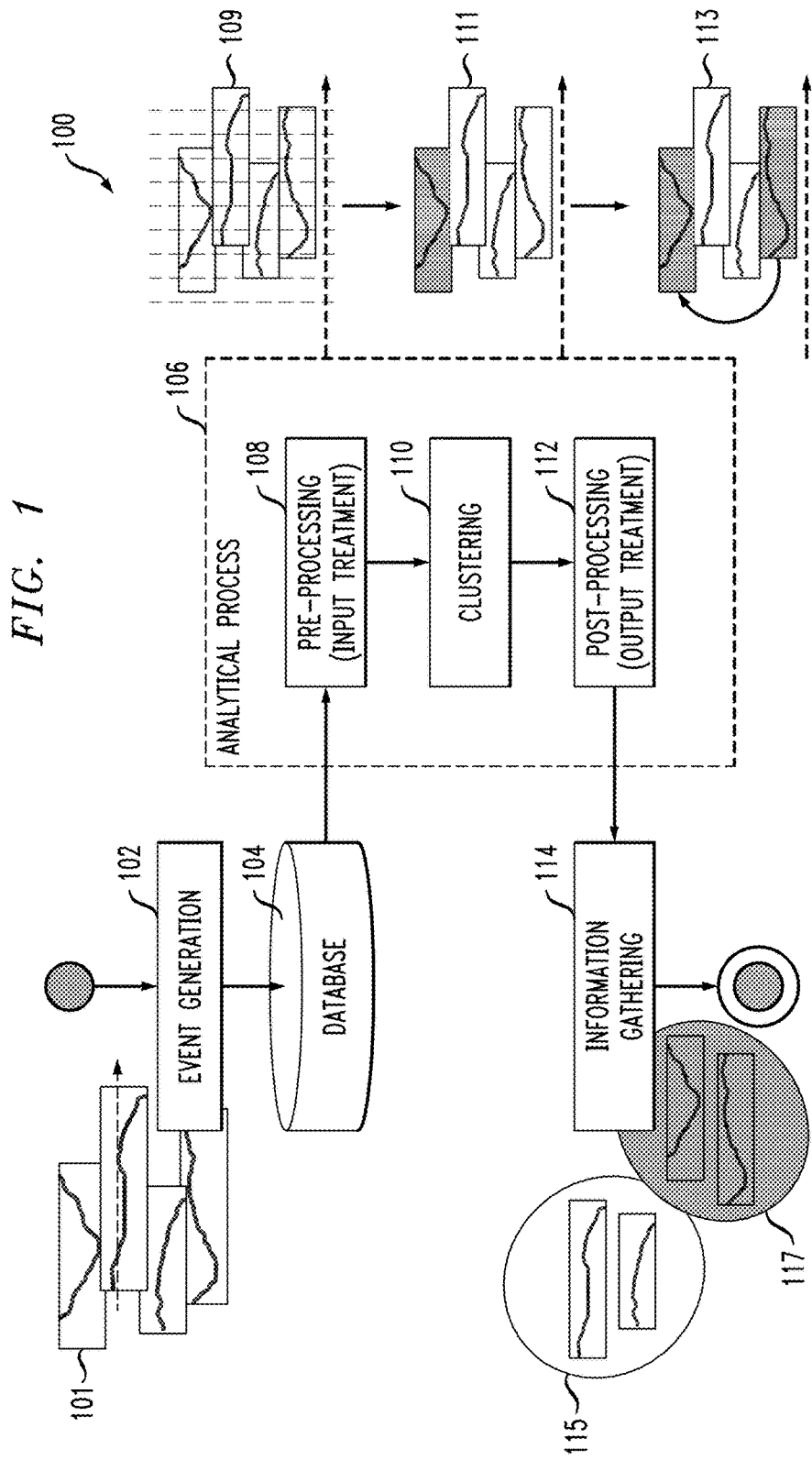
FIG. 1 shows an overview of a data processing system environment in accordance with which one or more embodiments of the invention may be implemented.

FIG. 1 shows an overview of a data processing system environment in accordance with which one or more embodiments of the invention may be implemented. As shown in system environment 100, an event generation step 102 feeds data to a database 104. The event data is represented as a plurality of time series data sets (each time series data set is depicted as a rectangle in the figure). It is to be appreciated that the event data can be any type of data from, by way of example only, real life physical processes to machine generated data.

Once fed, the database 104 supplies an analytical process 106, offering raw data that should be treated before the analysis phase. Once the raw data is treated in step 108, e.g., cleaned, synchronized, aligned, etc. as depicted in 109, it is passed to the desired analytical process 110, by way of example only, a data clustering process. The resulting output 111 may need some treatment, as well, so a post-processing phase is applied in step 112. When the post-processed and formatted data 113 is ready, the information becomes ripe, i.e., latent information present in the raw data emerges then as useful knowledge. Such latent information 115/117 can be gathered/harvested in step 114 and passed along to a business flow (not shown) or some other system/process.

It is realized herein that raw data analysis can be impractical when data manifests missing values, null values, and other inconsistencies. When these problems appear, the pre-processing step becomes more and more critical. A good choice of pre-processing treatment can lead to better analysis results. However, depending on the nature of the data and its quality/state, the alignment and comparison can be a difficult task. This process can mislead the analysis to unreal or incomplete results. It is realized herein, in accordance with illustrative embodiments, that it is advantageous to couple pre-processing with post-processing in order to attempt to assure that no underlying information is left unreachable.

Time series alignment and comparison when associated with missing or inconsistent data can misguide the analysis process. The analysis should be flexible enough to accept this faulty input and generate the best possible output results.

Further aligning and resampling the original series in "epochs" can lead to significant changes in features regarding the original real world events or machine generated data.

As is known, epochs are time windows. It is to be appreciated that time-stamped data is a basic type of time series data that associates values with points in time, wherein these values may be generated by sensors, mobile phones, or any other type of electronic device. It is realized that it is advantageous to consider such time-stamp data received from a plurality of sensors (each sensor generating a time series data set) as occurring within a certain epoch (i.e., certain time window). Thus, a plurality of epochs may be consecutive time windows of a certain width (duration) in which data from a plurality of time series is associated.

Once aligned, it is realized herein, in accordance with illustrative embodiments, that a compromise between the completeness of the time window and the support that it has on original data arises.

Still further, the output of the analytical process may present incomplete conclusions. As such, it is realized herein, in accordance with illustrative embodiments, that the post-processing phase should improve this result with intelligent approaches that benefit from the current state of the process but also guides it to a more complete outcome.

Illustrative embodiments of the invention incorporate pre-processing and post-processing techniques in the analytical workflow (in alternative embodiments, the pre-processing technique could be used without the post-processing technique, and vice versa). Based on decision theory and a set of well calibrated heuristics, such an approach leads to better analysis results, even when faulty or missing data is used as input.

FIG. 2A shows time series data divided into epochs in accordance with which one or more embodiments of the invention may be implemented. As denoted by reference numeral 202, assume that a plurality of sensors (for example, but not limited to, Sensor 1, Sensor 2, Sensor 3, and Sensor 4) each generate a series of time-stamped data values (time series data) based on one or more events (e.g., real world, computer generated, etc.). As shown, the time-stamped data values are divided into epochs, e.g., Epoch 1, Epoch 2, and Epoch 3. The epochs could all be the same size (duration) or one or more of the epochs could be a different size than one or more other of the epochs. Assume that, in this example, the epochs are determined based on some epoch-defining event which begins (Epoch beginning) at a particular time instance and ends (Epoch end) at a particular time instance. So as illustrated in FIG. 2A, the epoch-defining event begins just before time instance t3 and ends just after time instance t6, thus defining one epoch (the center epoch, Epoch 2, including data values that occur at time instances t3, t4, t5, and t6). Accordingly, data values that occur before Epoch 2 are part of Epoch 1 (data values at time instances t1 and t2), and those that occur after Epoch 2 are part of Epoch 3 (data values at time instances t7 and t8). Note that data values do not occur for every sensor time series at every time instance (by way of one example, note that Sensor 3 and Sensor 4 do not generate data values at t1 and t2). Thus, as mentioned above, this missing data can have an adverse effect on results of analytics processes that use this sensor data.

The time-stamped data values (raw input data) in 202 are also considered non-synchronized with regard to a given epoch (e.g., in Epoch 1, Sensor 1 generates a data value at t1 but not t2, while Sensor 2 generates data values at both time instances). Illustrative embodiments of the invention perform one or more synchronizing data operations on the epoch data for each sensor time series to align the data for analysis. Such data operations may include mathematical operations such as, but are not limited to, min, max, average, standard deviation operations. These operations provide summarizing and/or statistical data on the raw data for each time series in each epoch. The results of these operations are depicted as reference numeral 204 in FIG. 2A. Thus, by way of example only as shown for Sensor 2, the data values at time instances t1 and t2 are aligned by performing one of the data operations mentioned above, e.g., an average of the two data values can be computed and thus the average serves as the data value 206 for Sensor 2 in Epoch 1. Thus, the resulting data value in 204 computed for each sensor in each epoch describes periodically how the time series behaves in that specific time window. While FIG. 2A illustrates simple examples (relatively small numbers of time series and data values) for ease of understanding, it is to be appreciated that the above-mentioned data operations can be applied to much larger numbers of time series, data values in each time series, and/or epochs.

An example of an aligned epoch matrix is illustrated in FIG. 2B. That is, the matrix (table) in FIG. 2B shows aligned data values respectively associated with time series across a plurality of epochs. In this example, table 210 represents the average value for 15 different time series (columns) aligned by epochs (rows). It is to be appreciated that a data value in one of the cells of table 210 is comparable to data value 206 in FIG. 2A. Visualizing data in this manner clearly exposes the gaps between the original data series. For some epochs (sometimes consecutive epochs), there is little or no information stored in the event database.

One possible approach to pre-process such data prior to application of data analytics could be to fill these gaps with data generated via regression or some type of interpolation. The problem with such regression/interpolation approaches is the potential error that could be artificially added to the system. With regression or interpolation, the analysis could be misguided.

Advantageously, illustrative embodiments of the invention provide a simple yet efficient way to prune missing data. As will be explained in further detail below, a decision theory-based approach is applied to choose which epochs to analyze, and which to prune or leave out of the analysis. This is accomplished by computing a cost function to determine the importance of the "completeness" of an epoch and the "support" of an epoch. In an illustrative embodiment, the completeness attribute is the number of distinct data sources (time series, for example) presented at that epoch (e.g., number of time series that have data points occurring in the epoch), and the support attribute is the number of data points responsible for that epoch (e.g., how many values where used in averaging operations, or more generally, how many data points occur in that epoch across the time series). This cost function weighs the completeness attribute and the support attribute with weights that can be tuned by experiments and training (automatically, manually, or some combination thereof).

Thus, for a given application and type of event data, if the completeness attribute is more important, for example, this tuning process can emphasize the completeness attribute. Emphasis of the completeness attribute is especially useful when dealing with many different data sources, such as several distinct sensors, for example. The information, for this example, lays more on the number of distinct sensors processed and less on the number of measurements sent by each one of them. If an application relies on few data sources, the support attribute may be more important, because the latent information on the support attribute will describe better the few sensing unities, for example, than the completeness of each epoch.

This weighting process is not trivial and can be done manually by the designer or automatically via some kind of training. For example, automatic training mechanisms may involve supervised learning, where a sub-set of the epochs receive a score (sometimes written manually by the designer) and the training system tries to translate that set of pairs <epoch,score> into some kind of model (such as, but not limited to, mathematical model trained via regression, neural-network systems, genetic algorithms, artificial intelligence algorithms). The supervised learning method should thus reflect the relevance of that sub-set and propagate the model that generates that relevance throughout the other sets, generating the function (or metric) that will be used later on to rank the epochs accordingly. If, otherwise, the designer choses to weight the epochs manually without any kind of computational support, he/she can incrementally chose a function that better describes the underlying phenomena.

It is to be appreciated that a variety of functions could be used to implement the completeness and support attributes described herein to measure the relevance of an epoch and thus whether or not data from the epoch should be used in the analytics. One such example is a function defined as: support*(completeness$^{1.5}$). The important part here is the flexibility brought by this approach. This new relevance metric provides an analytical dimension that highlights important parts of data that may pass unnoticed otherwise. Again, the particular function used to express the completeness and support attributes can be chosen manually by a designer or automatically by some computing system.

Accordingly, an epoch relevance metric is generally defined by a function that receives as input the number of time series and the number of data points for that epoch:

$$\text{relevance(epoch)} = \phi(\text{completeness}, \text{support}) \quad \text{Eq. 1}$$

Figure 3A:
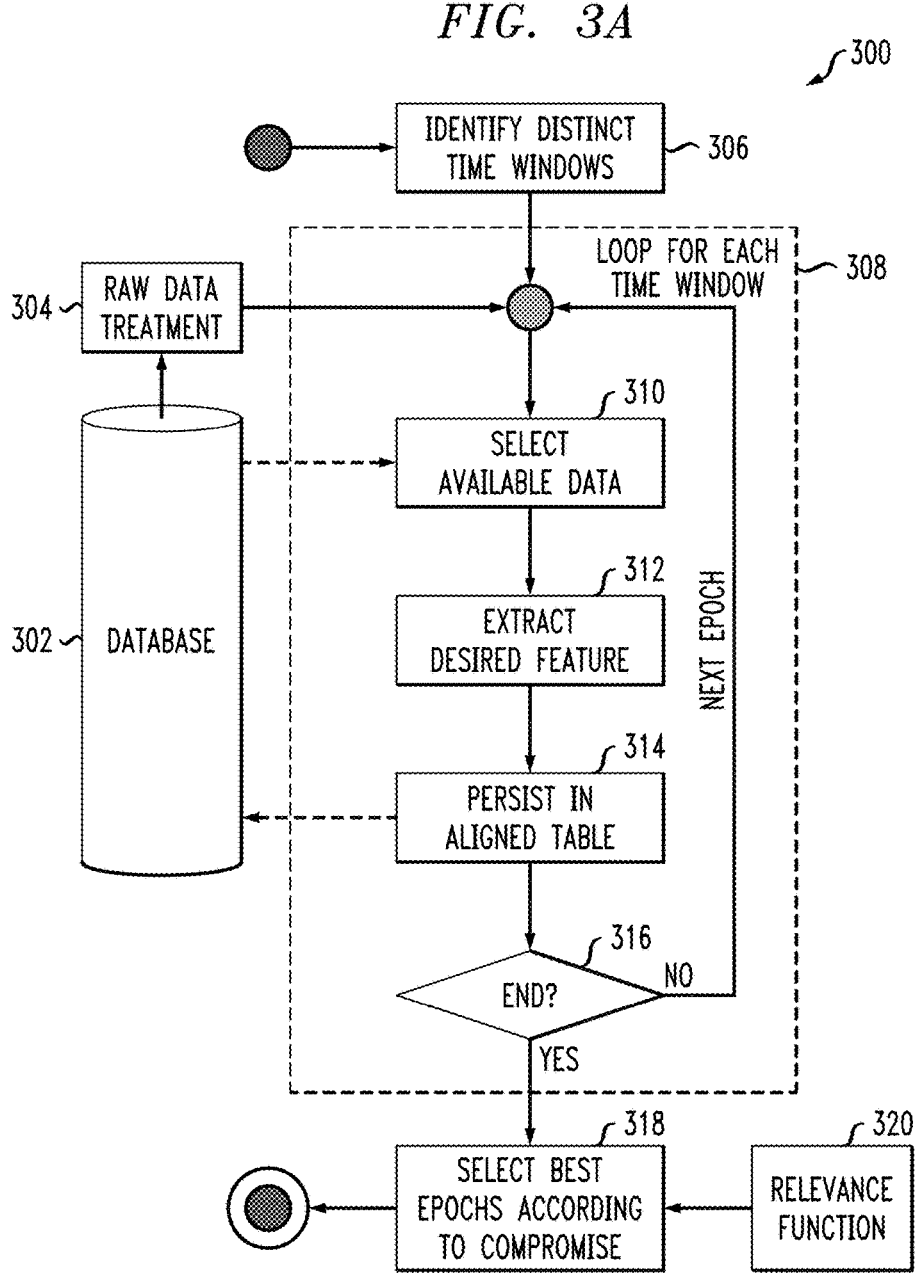
FIG. 3A shows a data pre-processing methodology in accordance with one embodiment of the invention.

Again, the flexibility provided by the resulting decision process (i.e., which epochs to keep for the analysis and which to prune) has a major impact on the overall system efficiency. The tuning involved can easily highlight the most important aspects of the data series that would pass otherwise unnoticed. This epoch selection concludes the pre-processing phase, serving as input to the desired analytical process that follows in the workflow. Whichever the analytical process (embodiments are not limited to a specific analytical process, nonetheless, a k-means clustering algorithm is used as an example in FIG. 5), the input now is ready to be ingested, meaning that the impact of missing data has been minimized and the relevant data features were aligned and prepared to be used. The overall pre-processing phase in accordance with one illustrative embodiment is shown in FIG. 3A.

As shown in pre-processing phase 300, raw input data stored in database 302 (e.g., event data 101 stored in database 104 in FIG. 1) is treated in step 304. Raw data treatment comprises typical formatting operations that are performed on raw data that is received from a sensor or other device. By way of example only, assume that each sensor sends data in a given format (e.g., strings, floats, doubles, etc.) to database 302. Step 304 parses the raw data into a given format that is expected by subsequent operations in the pre-processing phase. In one example, a timestamp can be reformatted from the 'day/month/year' format to the 'month/day/year'. Those of ordinary skill in the art will realize other typical formatting operations that may be applied.

In step 306, a distinct time window, i.e., epoch, is identified. In step 310, the treated raw data for the identified epoch is selected. In step 312, the data alignment/synchronizing operations described above in the context of FIG. 2A are performed to extract a desired feature (e.g., average, min, max, etc.) from the data in the identified epoch. Thus, for example, the loop 308 (after each epoch is iteratively pre-processed in this step) may result in an aligned table such as the aligned epoch matrix in FIG. 2B. This aligned table is incrementally stored (persisted) in database 302 in step 314. If this is not the last epoch to be considered (determined at step 316), another epoch is identified (step 306) and steps 310, 312 and 314 are performed for that epoch.

Once all epochs have been treated in the above manner with respect to steps 304 through 316, the epoch relevance metric for each epoch is computed in step 318 using relevance function 320 (equation 1 above). That is, the completeness and support attributes are determined and the weighted cost function is computed to yield an epoch relevance value (score) for each epoch. It is to be appreciated that the epoch relevance values can be stored in the database. However, alternatively, the completeness and support attributes may be persisted, while the actual relevance scores may be computed in real-time. Thus, if the relevance function that generates the score changes, the database does not have to be updated. In such an implementation, one or more modules can ingest the completeness and support attributes and return as output the score. Then, given an epoch relevance value for each epoch, step 318 selects the best epoch(s) according to some compromise criteria.

FIG. 3B illustrates some compromise criteria using the example epoch alignment illustrated in 204 of FIG. 2A. For illustration purposes, note in FIG. 3B that there are two scores shown for each epoch, where the two scores respectively represent two different relevance metrics, as will be explained below. Note also how the scores for a given function vary from epoch to epoch depending on the number of time series and the number of data points (data points or values), respectively. Below the scores in FIG. 3B are some compromise criteria that may be considered by the system/designer when selecting the appropriate function for the relevance metric.

In FIG. 3B the scores were calculated using linear functions. The top set of values (labeled Score (function 1)), where the resulting scores in increasing order of preference are Epoch 1, Epoch 2 and Epoch 3, were calculated weighting completeness more than support. Specifically, the mathematical model is:

$$relevance=85*completeness+0.20*support.$$

So perhaps with this particular relevance metric, by way of example only, data associated with Epoch 1 would be pruned and not sent to the analytical process.

The bottom set of values (labeled Score (function 2), where the resulting scores in increasing order of preference are Epoch 3, Epoch 2 and Epoch 1, were found using another criteria that gave more importance to support than the first criteria. The mathematical model is:

$$relevance=8*completeness+0.75*support.$$

So perhaps with this particular relevance metric, by way of example only, data associated with Epoch 3 would be pruned and not sent to the analytical process.

It is to be understood, however, that various other functions that weight the completeness and support attributes differently can be employed in alternative embodiments.

This set of one or more best epochs chosen by the compromise defined in equation 1 is passed to the desired analytical process, while the other epochs are not. Advantageously, the selected epochs summarize the important features presented in the original raw data without having the problems presented before, i.e., missing data, null values, etc. The analysis can be done, thus, over the desired data without concerns about misguidance and errors.

Nevertheless, once processed, the analysis output might still be incomplete. In some cases, the initial data pruning caused by blanks and holes may still result in useful information being left out of the analysis. In these cases, it is desirable to finalize the analysis phase with some post-processing that takes into account some existing information and the current state of the analysis to dig deeper into the data and harvest more latent information, obscured in some level by those lacunas in the original raw data.

Figure 4:
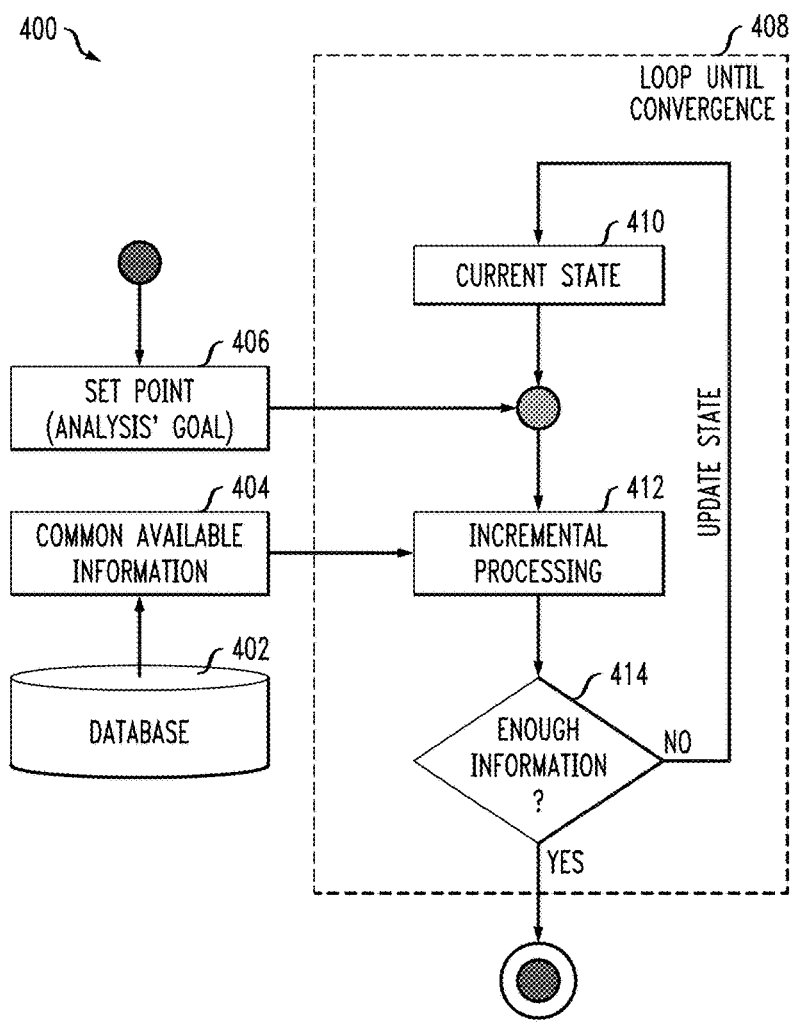
FIG. 4 shows a data post-processing methodology in accordance with one embodiment of the invention.

FIG. 4 shows a data post-processing methodology in accordance with one embodiment of the invention. The post-processing phase 400 shown in FIG. 4 identifies three distinct intakes used to finish the analytical process: the desired output (set point 406), the current state of the analysis (410) and the common available information (404) for every entity (e.g., sensor, device, data source, or anything that feeds data to the database). With these three sets of information, an iterative process can ripen, step by step, the current state, driving it to the goal and bringing that hidden information to the surface.

That is, the post-processing identifies the goal (i.e., what kind of information is necessary at the end) and tries to guide the system through the process until it reaches that objective. The process compares the current state 410 of the analytical process with the desired goal 406, and if they differ at some point, the process steers the analysis toward that end via incremental processing 412, choosing along the way, the available information 404 shared between the involved entities that can be used at current iteration. This information gathering identifies available data that can be used as input to some complimentary analysis, trying to iteratively (via step 414) complement the initial analytical process until it fulfils the desired information threshold or goal (loop until convergence 408).

The major intake of this incremental processing is the common information shared by the entities involved on the analysis. This information enriches the unfinished analytical process from previous step. In order to do so, it should be something that every involved entity shares, for example, geographical position of the sensor. Usually, when subscribing sensors and devices to an "Internet of Things" (IoT) type application, the user/software agent must provide some information to the environment. Although, this (initial) mandatory information does not depend on the actual sensor state, it may still contain enough information to enrich the analysis. In those cases where it does not, other data should be comprised, such as incomplete time windows and smaller epochs. It is only a matter of fulfilling the analysis, and it is possibly much lighter than the actual processing, so a finer search is possible. A good approach is to search the database for some comparable knowledge shared across the involved entities and combine this available data with the analysis results.

More specifically, it is to be appreciated that any appropriate information may be used for the post-processing phase, as long as it is present for the time series that lacked processing. By way of example only, assume that there are ten sensors in an IoT application, whereby six of them were clustered on the standard analytical process (prior to any post-processing phase). Four of them still did not have clusters associated to them because of some problem, such as, for example, missing data for the chosen epochs to cluster. To fill these four gaps, the system searches for information shared among the un-clustered sensors with the clustered sensors. It may use time series information from other epochs to compare each of them with clustered sensors. The example of geographical position comes from the fact that this information is commonly mandatory on IoT environments. If the real-world events being sensed are geographically relevant (closer sensors tend to 'sense' more similar things), the geographical position should be used to fill the cluster with closest neighbors.

By way of another example, if one un-clustered sensor has data in a given epoch, the un-clustered sensor can be compared to the centroid of a cluster containing a sensor having data in the same given epoch. If the comparison indicates closeness, the un-clustered sensor could be added to the given cluster. So in this case, the commonly available information is the fact that the un-clustered sensor has data in the same epoch as the clustered sensor. Note that while this example describes clustering sensors, it is typically the time series data attributable to the sensors that is clustered. It is to be appreciated that embodiments of the invention are not limited to any specific example of common available information to be used for the post-processing phase.

Figure 5:
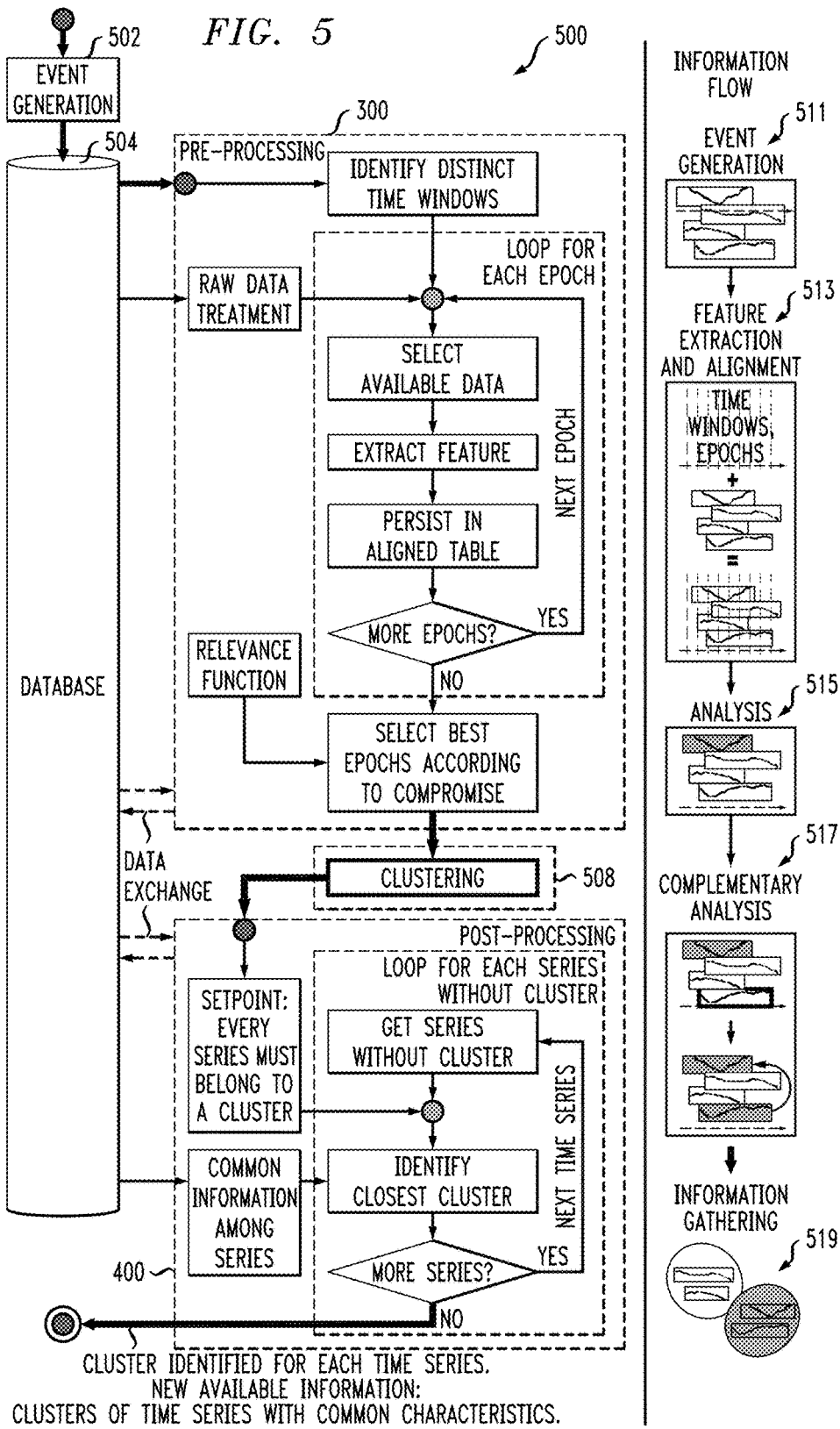
FIG. 5 shows a data processing system environment in accordance with one embodiment of the invention.

Once finished the post-processing, the hidden information initially present at the raw data now has emerged to be gathered by the subsequent processes along the workflow. This means that, whatever the analysis, the results now are the most complete possible, thus leveraging a far more efficient information retrieval process. In FIG. 5, described below, an example of a clustering workflow with actual data shows what this benefit represents.

By pre-processing the raw input data, the system can leverage good initial analysis results when aligning and cleaning missing and faulty data. The flexibility brought in by the epoch approach guarantees that even for bad scenarios, when possible, some level of information will be gathered from the raw data.

By selecting the best epochs based on a compromise between completeness and support, this approach highlights the most important aspect of the epochs. For some applications, perhaps the number of involved entities is the most important criteria here, but for others, a bigger support on the original data is better. The decision presents to the developer a very important way to handle the information flow that will pass through the analytical process.

By post-processing the output of a given analytical process, this approach allows a deeper information analysis. When comparing the current results with the residual data not yet used on the analysis, the post-processing phase leverages yet another possible point-of-view. During this phase, the main purpose is to profit from some available information shared across the entities to enrich the analysis and again, bring more information to the surface.

FIG. 5 shows an example of analytical workflow for the clustering of time series data. Where FIG. 1 shows an overview clustering workflow, FIG. 5 shows a more complete workflow with pre-processing and post-processing steps according to an illustrative embodiment.

In system environment 500, assume that in step 502 raw event data (depicted as 511) is generated and stored in database 504. Pre-processing phase 300 (as described above in the context of FIGS. 3A and 3B) is performed with the relevance function on the raw data yielding epoch aligned time series (as depicted in 513). A data clustering algorithm (e.g., k-means clustering) is performed on the aligned time series data to yield clustered data (515). Then, post-processing phase 400 (as described above in the context of FIG. 4) is performed where the set point (goal) is that every time series belong to a given cluster. Thus, each time series without a cluster following step 508 is considered, and the closest cluster to that time series is identified from common information (characteristics) among one or more time series stored in the event database. This post-processing is iterated until no more time series that are not assigned to a cluster exist (as depicted in 517). The post-processing can comprise one or more additional iterations of the clustering algorithm or a direct assignment of un-clustered time series to a given cluster. Thus, information can then be gathered (depicted as 519) from the clustered time series.

It is to be appreciated that all or portions of the data processing system environments described above in the context of FIGS. 1-5 may be implemented using one or more processing platforms, e.g., system environments 100 and 500. Illustrative embodiments of such platforms will now be described in greater detail.

Figure 6:
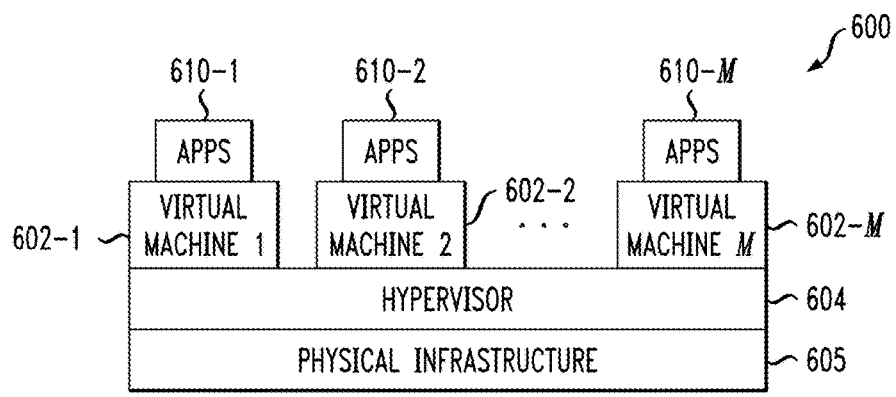
FIGS. 6 and 7 show examples of processing platforms that may be utilized to implement at least a portion of the data processing system of FIG. 5.

As shown in FIG. 6, portions of the system environment (100 and/or 500) may comprise cloud infrastructure 600. The cloud infrastructure 600 comprises virtual machines (VMs) 602-1, 602-2, . . . 602-M implemented using a hypervisor 604. The hypervisor 604 runs on physical infrastructure 605. The cloud infrastructure 600 further comprises sets of applications 610-1, 610-2, . . . 610-M running on respective ones of the virtual machines 602-1, 602-2, . . . 602-M under the control of the hypervisor 604.

Although only a single hypervisor 604 is shown in the embodiment of FIG. 6, the system (100 and/or 500) may of course include multiple hypervisors each providing a set of virtual machines using at least one underlying physical machine. For example, different sets of virtual machines provided by respective ones of multiple hypervisors may be utilized in configuring multiple instances of the pre-processing module, the clustering module, the post-processing module, or other components of the system (100 and/or 500).

An example of a commercially available hypervisor platform that may be used to implement hypervisor 604 and possibly other portions of the system in one or more embodiments of the invention is the VMware® vSphere® which may have an associated virtual infrastructure management system such as the VMware® vCenter™. The underlying physical machines may comprise one or more distributed processing platforms that include storage products, such as VNX® and Symmetrix VMAX®, both commercially available from EMC Corporation of Hopkinton, Mass. A variety of other storage products may be utilized to implement at least a portion of the system.

Figure 7:
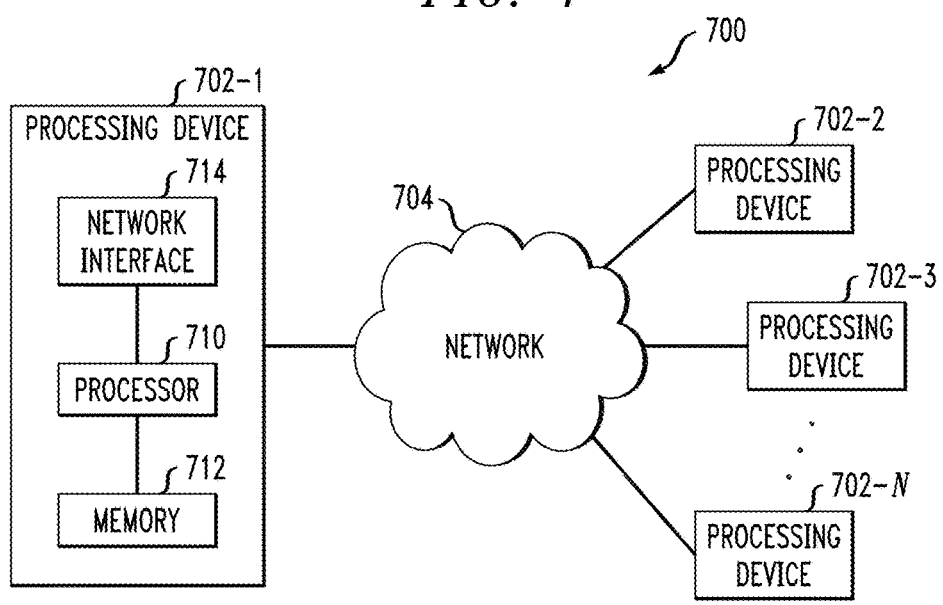

One or more of the processing modules or other components of the system (100 and/or 500) may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of the system (100 and/or 500) and includes a plurality of processing devices, denoted 702-1, 702-2, 702-3, . . . 702-N, which communicate with one another over a network 704.

The network 704 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 702-1 in the processing platform 700 comprises a processor 710 coupled to a memory 712.

The processor 710 may comprise a microprocessor, a microcontroller, an ASIC, an FPGA, or other type of processing circuitry, as well as portions or combinations of such circuitry elements.

The memory 712 may comprise RAM, ROM or other types of memory, in any combination. As mentioned previously, the memory 712 and other memories disclosed herein should be viewed as illustrative examples of what are more generally referred to as "processor-readable storage media" storing executable program code of one or more software programs, and articles of manufacture comprising such processor-readable storage media are considered embodiments of the present invention. Such storage media is non-transitory in nature since it does not store transitory (propagating) signals.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and the system (100 and/or 500) may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the system (100 and/or 500). Such components can communicate with other elements of the system over any type of network or other communication media.

It should again be emphasized that the above-described embodiments of the invention are presented for purposes of illustration only. Many variations may be made in the particular arrangements shown and described. For example, although described in the context of particular system and device configurations, the techniques are applicable to a wide variety of other types of information processing systems, processing devices, and other components. In addition, the particular modules, processing operations and other exemplary features of the illustrative embodiments may be varied to meet the needs of other implementations. Moreover, it should be understood that the various assumptions made above in describing illustrative embodiments need not apply in other embodiments. Numerous other embodiments within the scope of the appended claims will be readily apparent to those skilled in the art.

What is claimed is:

1. A method comprising:
    obtaining event data collected for a given event, wherein the event data comprises a plurality of time series data sets;
    dividing the plurality of time series data sets into a set of time windows;
    aligning data in the plurality of time series data sets occurring within each time window of the set of time windows;
    computing a metric for each aligned time window, wherein the metric for each aligned time window comprises a completeness attribute and a support attribute for each time window, wherein the completeness attribute for a given time window comprises the number of time series data sets represented in the given time window, and the support attribute for the given window comprises the number of data points from the time series data sets represented in the given time window;
    pruning data from the set of event data for one or more of the set of time windows based on the computed metrics;
    providing the pruned event data to a data analytics process which is configured to further process the pruned event data; and
    applying the data analytics process to the pruned event data to yield a set of analyzed event data;
    wherein the above steps are executed in accordance with one or more processing devices.

2. The method of claim 1, wherein the metric computing step further comprises weighting at least one of the completeness attribute and the support attribute for each time window based on one or more decision criteria.

3. The method of claim 1, wherein the aligning data step further comprises performing a data operation on data points for each time series data set within each time window to generate an aligned data value.

4. The method of claim 3, wherein the aligning data step further comprises storing the aligned data values in a matrix wherein one of rows and columns of the matrix represent time series data sets and the other of rows and columns of the matrix represent time windows.

5. The method of claim 3, wherein the data operation comprises an operation that mathematically characterizes the data points for the given time series within the given time window.

6. A method comprising:
    obtaining event data collected for a given event, wherein the event data comprises a plurality of time series data sets;
    dividing the plurality of time series data sets into a set of time windows;
    aligning data in the plurality of time series data sets occurring within each time window of the set of time windows;
    computing a metric for each aligned time window, wherein the metric for each aligned time window represents a measure of at least one of completeness and support attributable to data in the aligned time window;
    pruning data from the set of event data for one or more of the set of time windows based on the computed metrics;
    providing the pruned event data to a data analytics process which is configured to further process the pruned event data; and
    applying the data analytics process to the pruned event data to yield a set of analyzed event data, wherein the step of applying the data analytics process further comprises incrementally applying the data analytics process with additional information shared across at least a portion of the plurality of time series data sets, and wherein the incremental application of the data analytics process is iteratively performed until the data analytics process reaches a given set point;
    wherein the above steps are executed in accordance with one or more processing devices.

7. The method of claim 6, wherein the data analytics process comprises one or more processes for extracting one or more features from at least a portion of the plurality of the time series data sets.

8. The method of claim 6, further comprising gathering latent information from the set of analyzed event data.

9. An article of manufacture comprising a processor-readable storage medium having encoded therein executable code of one or more software programs, wherein the one or more software programs when executed by the one or more processing devices implement the steps of claim 1.

10. An apparatus comprising:
    a memory; and
    a processor operatively coupled to the memory and configured to:
    obtain event data collected for a given event, wherein the event data comprises a plurality of time series data sets;
    divide the plurality of time series data sets into a set of time windows;
    align data in the plurality of time series data sets occurring within each time window of the set of time windows;
    compute a metric for each aligned time window, wherein the metric for each aligned time window represents a measure of at least one of completeness and support attributable to data in the aligned time window;
    prune data from the set of event data for one or more of the set of time windows based on the computed metrics;
    provide the pruned event data to a data analytics process which is configured to further process the pruned event data; and apply the data analytics process to the pruned event data to yield a set of analyzed event data, wherein the step of applying the data analytics process further comprises incrementally applying the data analytics process with additional information shared across at least a portion of the plurality of time series data sets, wherein the incremental application of the data analytics process is iteratively performed until the data analytics process reaches a given set point.

11. The apparatus of claim 10, wherein the metric computing step further comprises computing a completeness attribute and a support attribute for each time window, wherein the completeness attribute for a given time window comprises the number of time series data sets represented in the given time window, and the support attribute for the given window comprises the number of data points from the time series data sets represented in the given time window.

12. The apparatus of claim 11, wherein the metric computing step further comprises weighting at least one of the completeness attribute and the support attribute for each time window based on one or more decision criteria.

13. The apparatus of claim 10, further comprising gathering latent information from the set of analyzed event data.

14. A method comprising:
obtaining event data collected for a given event, wherein the event data comprises a plurality of time series data sets;
treating the plurality of time series data sets by dividing the plurality of time series data sets into a set of epochs and aligning data in the plurality of time series data sets occurring within each epoch of the set of epochs;
pre-processing the treated plurality of time series data sets by computing a metric for each aligned epoch, wherein the metric for each aligned time window represents a measure of at least one of completeness and support attributable to data in the aligned time window, and pruning data from the set of event data for one or more of the set of epochs based on the computed metrics;
applying a data analytics process to the pruned event data to yield a set of analyzed event data; and
post-processing the analyzed event data by incrementally applying the data analytics process with additional information shared across at least a portion of the plurality of time series data sets, wherein the incremental application of the data analytics process is iteratively performed until the data analytics process reaches a given set point;
wherein the above steps are executed in accordance with one or more processing devices.

15. The method of claim 14, wherein the aligning data step further comprises performing a data operation on data points for each time series data set within each epoch to generate an aligned data value.

16. The method of claim 15, wherein the aligning data step further comprises storing the aligned data values in a matrix wherein one of rows and columns of the matrix represent time series data sets and the other of rows and columns of the matrix represent epochs.

17. The method of claim 15, wherein the data operation comprises an operation that mathematically characterizes the data points for the given time series within the given epoch.

18. The apparatus of claim 10, wherein the aligning data step further comprises performing a data operation on data points for each time series data set within each time window to generate an aligned data value.

19. The apparatus of claim 18, wherein the aligning data step further comprises storing the aligned data values in a matrix wherein one of rows and columns of the matrix represent time series data sets and the other of rows and columns of the matrix represent time windows.

20. The apparatus of claim 18, wherein the data operation comprises an operation that mathematically characterizes the data points for the given time series within the given time window.

* * * * *